(12) United States Patent
Martin et al.

(10) Patent No.: US 7,218,499 B2
(45) Date of Patent: May 15, 2007

(54) CHARGE CONTROL CIRCUIT

(75) Inventors: Eric Martin, Corvallis, OR (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 561 days.

(21) Appl. No.: 10/763,006

(22) Filed: Jan. 22, 2004

(65) Prior Publication Data

US 2004/0240138 A1    Dec. 2, 2004

Related U.S. Application Data

(63) Continuation-in-part of application No. 10/437,522, filed on May 14, 2003, now abandoned.

(51) Int. Cl.
*H01H 47/00* (2006.01)
(52) U.S. Cl. .................................................... 361/207
(58) Field of Classification Search ................. 361/207
See application file for complete search history.

(56) References Cited

U.S. PATENT DOCUMENTS

| 5,889,708 | A | 3/1999 | Hwang | ................ | 365/189.07 |
|---|---|---|---|---|---|
| 6,195,196 | B1 | 2/2001 | Kimura et al. | ............... | 359/295 |
| 6,552,713 | B1 * | 4/2003 | Van Brocklin et al. | ..... | 345/157 |
| 6,657,421 | B1 | 12/2003 | Pastor et al. | ................ | 323/303 |
| 2001/0043167 | A1 | 11/2001 | Sugahara et al. | | |
| 2004/0227493 | A1 | 11/2004 | Van Brocklin et al. | | |
| 2004/0240138 | A1 | 12/2004 | Martin et al. | | |

FOREIGN PATENT DOCUMENTS

| EP | 0 695 959 A1 | 2/1996 |
|---|---|---|
| EP | 1 473 581 A2 | 11/2004 |
| EP | 1 473 691 A2 | 11/2004 |
| WO | WO 99/52006 | 10/1999 |
| WO | WO 2004/099861 A2 | 11/2004 |

* cited by examiner

*Primary Examiner*—Stephen W. Jackson (57) ABSTRACT

A charge control circuit includes a switch circuit having an input node configured to receive a reference voltage at a selected voltage level and configured to respond to a charge signal to pre-charge the input node with a pulse charge at the selected voltage level. The switch circuit further includes a single switch configured to respond to an enable signal having a duration shorter than a mechanical time constant of a micro-electro mechanical device (MEM device) having a variable capacitor with first and second plates and wherein the single switch is coupled to the MEM device to apply the selected voltage level across first and second plates of a variable capacitor of the MEM device for the duration to thereby cause the pulse charge to accumulate on the variable capacitor.

34 Claims, 7 Drawing Sheets

CHARGE CONTROL CIRCUIT

RELATED APPLICATIONS

This application is a continuation-in-part of U.S. application Ser. No. 10/437,522, entitled: "Charge Control of Micro-Electromechanical Device," filed May 14, 2003 now abandoned, which is incorporated herein by reference in its entirety.

BACKGROUND

Micro-electromechanical systems (MEMS) are systems which are developed using thin film technology and which include both electrical and micro mechanical components. MEMS devices are used in a variety of applications such as optical display systems, pressure sensors, flow sensors, and charge control actuators. MEMS devices use electrostatic force or energy to move or monitor the movement of micro-mechanical components. In one type of MEMS device, to achieve a desired result, a gap distance between electrodes is controlled by balancing an electrostatic force and a mechanical restoring force. Digital MEMS devices use two gap distances, while analog MEMS devices use multiple gap distances.

Such MEMS devices have been developed using a variety of approaches. In one approach, a deformable deflective membrane is positioned over an electrode and is electrostatically attracted to the electrode. Other approaches use flaps or beams of silicon or aluminum, which form a top conducting layer. With optical applications, the conducting layer is reflective while the deflective membrane is deformed using electrostatic force to direct light, which is incident upon the conducting layer.

One approach for controlling the gap distance between electrodes is to apply a continuous control voltage to the electrodes, wherein the control voltage is increased to decrease the gap distance, and vice-versa. However, this approach suffers from electrostatic instability that greatly reduces a useable operating range over which the gap distance can be effectively controlled. This is because the electrodes form a variable capacitor whose capacitance increases as the gap distance decreases. When the gap distance is reduced to a certain threshold value, usually about two-thirds of an initial gap distance, the electrostatic force of attraction between the electrodes overcomes the mechanical restoring force causing the electrodes to "snap" together or to mechanical stops. This is because at a distance less than the minimum threshold value, the capacitance is increased to a point where excess charge is drawn on the electrodes resulting in increased electrostatic attraction. This phenomenon is known as "charge runaway."

This non-linear relationship between the control voltage and the gap distance limits the controllable range of electrode movement to only about one-third of the initial gap distance, and thus limits the potential utility of the MEMS device. For example, with optical systems, interference or diffraction based light modulator MEMS devices preferably should have a large range of gap distance control in order to control a greater optical range of visible light scattered by the optical MEMS device.

SUMMARY

A charge control circuit includes a switch circuit having an input node configured to receive a reference voltage at a selected voltage level and configured to respond to a charge signal to pre-charge the input node with a pulse charge at the selected voltage level. The switch circuit further includes a single switch configured to respond to an enable signal having a duration shorter than a mechanical time constant of a micro-electro mechanical device (MEM device) having a variable capacitor with first and second plates and wherein the single switch is coupled to the MEM device to apply the selected voltage level across first and second plates of a variable capacitor of the MEM device for the duration to thereby cause the pulse charge to accumulate on the variable capacitor.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A charge control circuit includes a switch circuit having an input node configured to receive a reference voltage at a selected voltage level and configured to respond to a charge signal to pre-charge the input node with a pulse charge at the selected voltage level. The switch circuit further includes a single switch configured to respond to an enable signal having a duration shorter than a mechanical time constant of a micro-electro mechanical device (MEM device) having a variable capacitor with first and second plates wherein the single switch is and coupled to the MEM device to apply the selected voltage level across first and second plates of a variable capacitor of the MEM device for the duration to thereby cause the pulse charge to accumulate on the variable capacitor.

As used herein and in the appended claims, the terms "transistor" and "switch" are meant to be broadly understood as any device or structure that is selectively activated in response to a signal.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
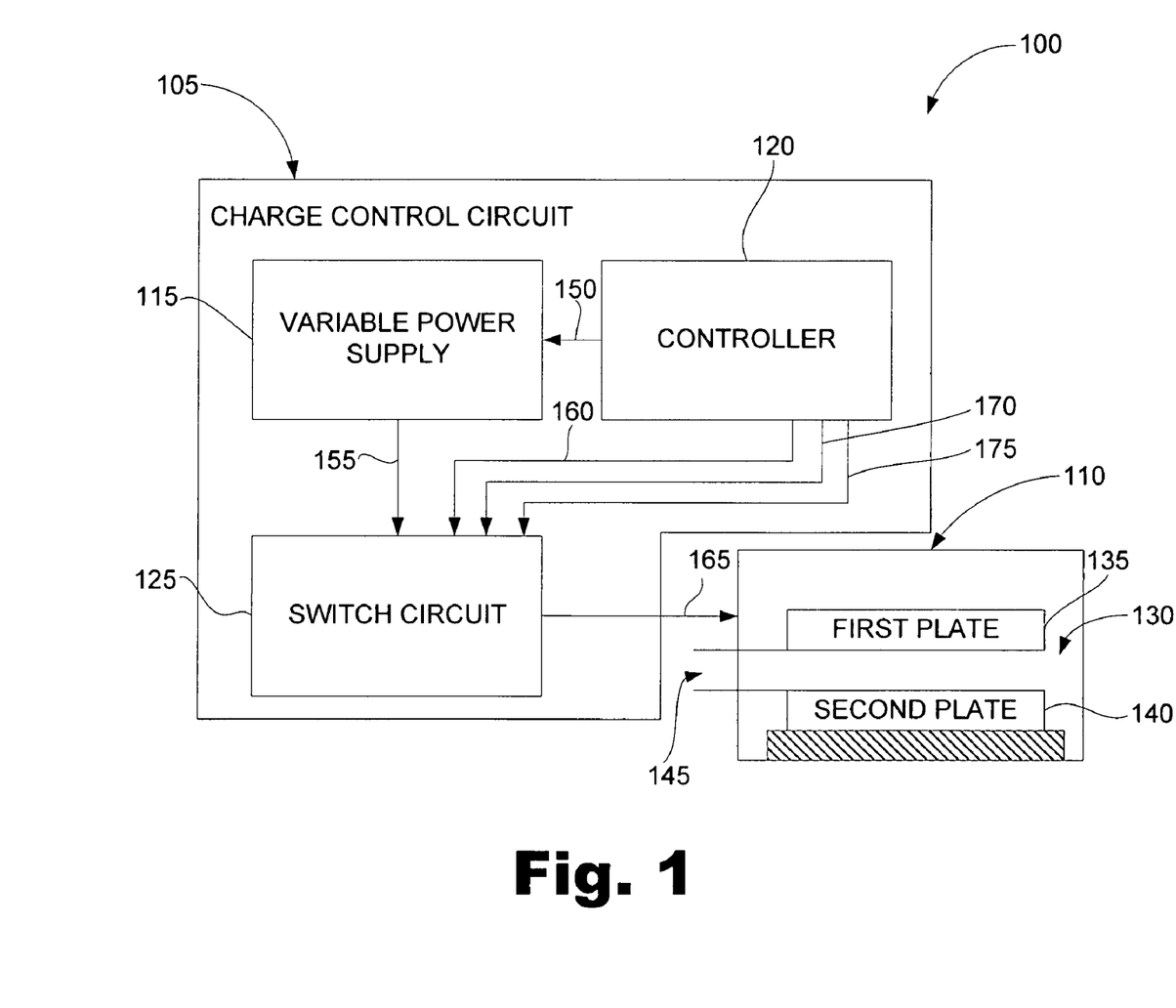
FIG. 1 is a simple block diagram illustrating a MEMS according to one exemplary embodiment.

FIG. 1 is a block diagram illustrating an exemplary embodiment of a micro-electromechanical system (MEMS) (100). The MEMS (100) includes a charge control circuit (105) and a micro-electromechanical device (MEM device) (110). The charge control circuit (105) further includes a variable power supply (115), a controller (120), and a switch circuit (125). The MEM device (110) further includes a variable capacitor (130) including a first conductive plate (135) and a second conductive plate (140) separated by a variable gap distance (145). The variable gap distance (145) that separates the first conductive plate (135) and the second conductive plate (140) is a function of a magnitude of a stored charge on the variable capacitor (130). In order to accommodate the relative motion between the first conductive plate (135) and the second conductive plate (140), either of the conductive plates may be fixed while the other is moveable. For ease of reference, the second conductive plate (140) will be considered as the fixed plate according to the present exemplary embodiment.

The charge control circuit (105) is configured to control the MEM device (110) by applying a reference voltage provided by the variable power supply (115) to the first and second conductive plates (135, 140) for a predetermined duration to thereby cause a stored charge having a desired magnitude to accumulate on the variable capacitor (130). The charge is stored in response to a charge signal sent by the controller (120) to the switch circuit (125) by way of a charge control path (175). Accordingly, an input node of the switch circuit is pre-charged. By applying a reference voltage of a precise value across the first and second conductive plates (135, 140), the charge stored on the variable capacitor (130) and thus the size of the variable gap (145) can be controlled over a wide range.

The variable power supply (115) is a variable voltage source configured to receive a voltage select signal from controller (120) via a path (150) and to provide the reference voltage having a selected voltage level based on the voltage select signal to the switch circuit (125) via a path (155). The charge signal discussed above controls whether this reference voltage pre-charges the input node of the switch circuit (125) at the selected voltage. Once the input node has been pre-charged, the charge is conveyed to the variable capacitor (130).

The switch circuit (125) is configured to receive an enable signal of a pre-determined duration via a path (160) and, in response, to apply the selected voltage level during the pre-determined duration period to the MEM device (110) via a path (165) to thereby cause a stored charge having a desired magnitude to accumulate on the variable capacitor (130). In one exemplary embodiment, the switch circuit (125) is configured to receive a clear signal from the controller (120) via a path (170) and, in response to the clear signal to remove a potential stored charge on the variable capacitor (130). Removing the stored charge places the variable capacitor (130) at a known charge level prior to applying the reference voltage having the selected voltage level.

Exemplary Implementation and Operation

Figure 2:
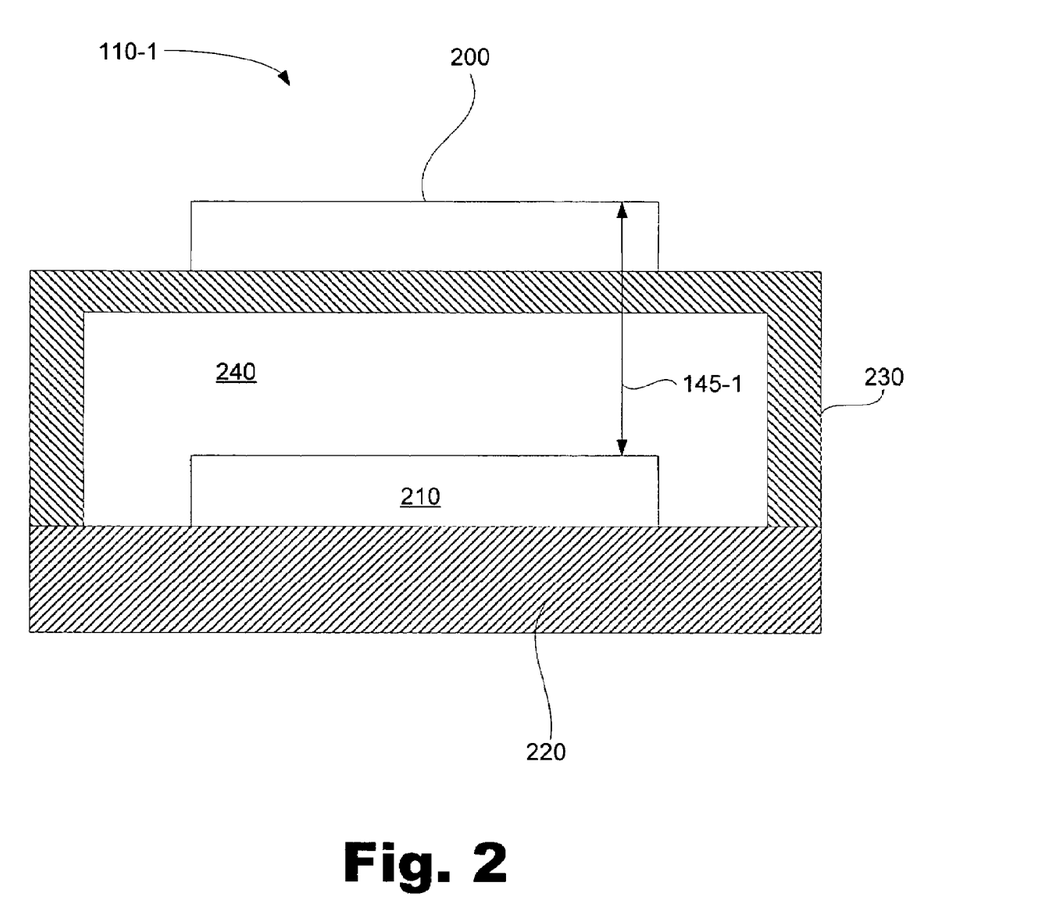
FIG. 2 is a cross-sectional view illustrating a MEM device according to one exemplary embodiment.

FIG. 2 is a diagram illustrating an exemplary embodiment of a MEM device (110-1). In the exemplary embodiment, the MEM device (110-1) displays, at least partially, a pixel of a displayable image. The MEM device (110-1) includes a top reflector (200), a bottom reflector (210), a flexure (220), and a spring mechanism (230). A resonant optical cavity (240) is defined by the reflectors (200, 210). The two reflectors (200, 210) are separated by a variable gap distance (145-1). The top reflector (200) may be semi-transparent or semi-reflective and used with a bottom reflector (210) that may be highly reflective or complete reflective or vice-versa. The spring mechanism (230) may be any suitable flexible material, such as a polymer, that has linear or non-linear spring functionality.

The optical cavity (240) can be adjusted to select a visible wavelength at a particular intensity using optical interference. Depending on the configuration of MEM device (110-1), the optical cavity (240) can either reflect or transmit the wavelength at the desired intensity. That is, the optical cavity (240) can be reflective or transmissive in nature. No light is generated by the optical cavity (240). Accordingly, the MEM device (110-1) relies on ambient light or other external sources of light. The visible wavelength transmitted by the optical cavity (240) and its intensity are dependent on the gap distance (145-1) between the top and bottom reflectors (200, 210). Accordingly, the optical cavity (240) can be tuned to a desired wavelength at a desired intensity by controlling the gap distance (145-1)

The flexure (220) and the spring mechanism (230) allow the gap distance (145-1) to vary when an appropriate amount of charge has been stored on the reflectors (200, 210), such that a desired wavelength at a desired intensity is selected. This charge, and the corresponding voltage, is determined in accordance with the following Equation I, which is the force of attraction between the reflectors (200, 210). Accordingly, the reflectors (200, 210) and the variable gap distance (145-1) act as a parallel plate capacitor which does not take into account fringing fields.

$$F = \frac{\varepsilon_0 V^2 A}{2d^2},$$ Equation I where $\varepsilon_0$ is the permittivity of free space, V is the voltage across the reflectors (200, 210), A is the area of each of the reflectors (200, 210), and d is the instantaneous gap distance (145-1). Thus, a one volt potential across a 70 micron square pixel, with a gap distance (145-1) of 0.25 microns yields an electrostatic force of $7 \times 10^{-7}$ Newtons (N).

Therefore, an amount of charge corresponding to a small voltage between the reflectors (200, 210) provides sufficient force to move the top reflector (200) and hold it against gravity and other forces such as physical shock. The electrostatic charge stored in the reflectors (200, 210) is sufficient to hold the top reflector (200) in place without additional power.

The force defined in Equation I is balanced with the linear spring force provided by the spring mechanism (230). This force is characterized by a second equation.

$$F = k(d_0 - d),$$ Equation II where k is the linear spring constant, $d_0$ is the initial value of the gap distance (145-1), and d is the instantaneous gap distance (145-1).

As discussed previously, the range in which the forces of Equations I and II are in stable equilibrium using voltage control occurs when the value $(d - d_0)$ is between 0 and $d_0/3$.

At $(d-d_0)>d_0/3$, the electrostatic force of attraction of Equation I over comes the spring force of Equation II, such that the reflectors (200, 210) snap together. This occurs because when the variable gap distance d is less than $d_0/3$, excess charge is drawn onto the reflectors (200, 210) due to an increased capacitance, which in turn increases the attractive force of Equation I between the reflectors (200, 210) thereby causing them to be drawn together.

However, the force between the reflectors (200, 210) of Equation I can instead be written as a function of charge according to a third equation.

$$F = \frac{-Q^2}{2\varepsilon A},\qquad \text{Equation III}$$

where Q is the charge on the capacitor.

With the force F as a function of charge Q rather than d, it can be seen that the variable gap distance (145-1) can be controlled over the entire gap distance, such as a range from nearly 0 to $d_0$ by controlling the amount of charge on the reflectors (200, 210) rather than voltage. This range may increase the control range from about 66% 77–95% or more Furthermore, the MEM device (110-1) has a mechanical time constant that causes delays in the movement of the reflector (200) resulting from changes in charge Q on the variable capacitor. The mechanical time constant can be controlled by, among other things, the material used in the spring mechanism (230) and by the environment in which the MEM device (110-1) operates. For example, the mechanical time constant of the MEM device (110-1) will have one value when operating in air and another value when operating in an environment of helium.

The charge control circuit (105) utilizes each of these characteristics to control the gap distance over substantially the entire gap. By applying a selectable control voltage to the MEM device (110-1) based on a duration of an enable signal, where the duration is less than the mechanical time constant of the MEM device (110-1), the variable capacitance of the MEM device (110-1) appears to be "fixed" for the duration that the reference voltage is applied. As a result, the desired charge, Q, accumulated on the reflectors (200, 210) from the application of the selected reference voltage can be determined by a fourth equation, Equation IV.

Equation IV:

$$Q = C_{INT} V_{REF}$$

where $V_{REF}$ is the selected reference voltage and $C_{INT}$ is the initial capacitance of the MEM device (110-1).

By keeping the duration of the enable signal (i.e., the electrical time constant) less than the mechanical time constant, the reference voltage is applied to the MEM device (110-1) for a specific duration to deliver the desired charge and then removed. Once the reference voltage has been removed, the MEM device (110-1) is floated, or tri-stated, thus preventing additional charge from accumulating and enabling effective control of the gap distance for an increased control range relative to direct voltage control of the MEM device (110-1).

Although the description of the preceding paragraphs is with respect to an ideal parallel-plate capacitor and an ideal linear spring restoring force, those of ordinary skill within the art can appreciate that the principle described can be adapted to other MEM devices such as interference-based or diffraction-based display devices, parallel plate actuators, non-linear springs and other types of capacitors. With display devices, when the usable range is increased, more colors, saturation levels, and intensities can be achieved.

In an application where a MEMS device is repeatedly addressed and "written" with a charge, the device is preferably be reset to a known state (known initial capacitance) before each write. Typically, this reset would require additional circuitry, such as a second drain of a metal oxide semiconductor (MOS) device on the node that makes the electrical connection between the MEM device and the controlling circuitry. However, minimizing this capacitance would help maximize the gap control range in charge control. More specifically, minimizing the ratio $C_p/C_o$ yields a maximum range of control (where $C_p$ is the parasitic capacitance on the node electrically connected to the top plate of the MEMS device and $C_o$ is the initial capacitance of the MEMS or variable capacitor. One exemplary embodiment of a charge control circuit using a voltage reference source which minimizes $C_p$ will now be discussed.

FIGS. 3A–D are schematic representations of a MEMS (100-1) which enables charge control by the charge control circuit (125-1). The capacitance on the input node of the variable capacitor (130-1) is reduced because the variable capacitor (130-1) is directly connected to a single switch.

Figure 3A:
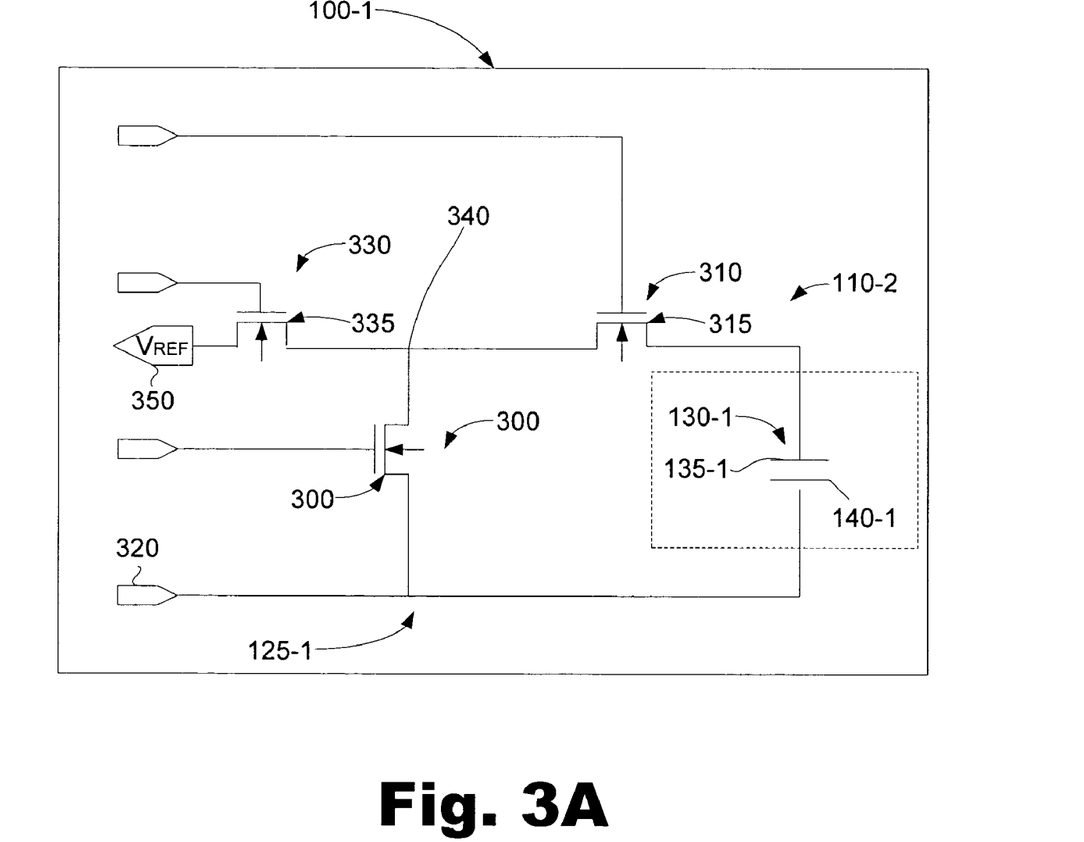
FIG. 3A is a schematic diagram illustrating an exemplary MEMS according to one exemplary embodiment.

FIG. 3A is a schematic representation of the MEMS (100-1) in an inactive state. The MEMS includes a clear transistor (300), a first or enable transistor (310), a clear voltage (320), a second or charge enable transistor (330), and a variable capacitor (130-1). The enable transistor (310) includes a gate (315). Alternatively, a switch type device may be used in place of the transistors. The enable transistor (310) is the only switch that is directly connected to the variable capacitor (130-1). This configuration reduces the capacitance of the input node (340) because the variable capacitor 'sees' only the drain of the enable transistor (310), which provides for increased control range of the variable capacitor (130-1). In addition, the present apparatus provides for a cost effective system because the transistors can be either all p-channel metal oxide semiconductor (PMOS) devices or n-channel metal oxide semiconductor (NMOS) devices. The exemplary description that follows assumes NMOS for ease of understanding. Those of skill in the art will appreciate that an PMOS can be substituted for the NMOS transistors. Further, the present configuration may allow for a relatively small complimentary metal oxide semiconductor (CMOS) footprint per MEM device, which could also result in a more cost effective formation processes or in higher yields.

Figure 3B:
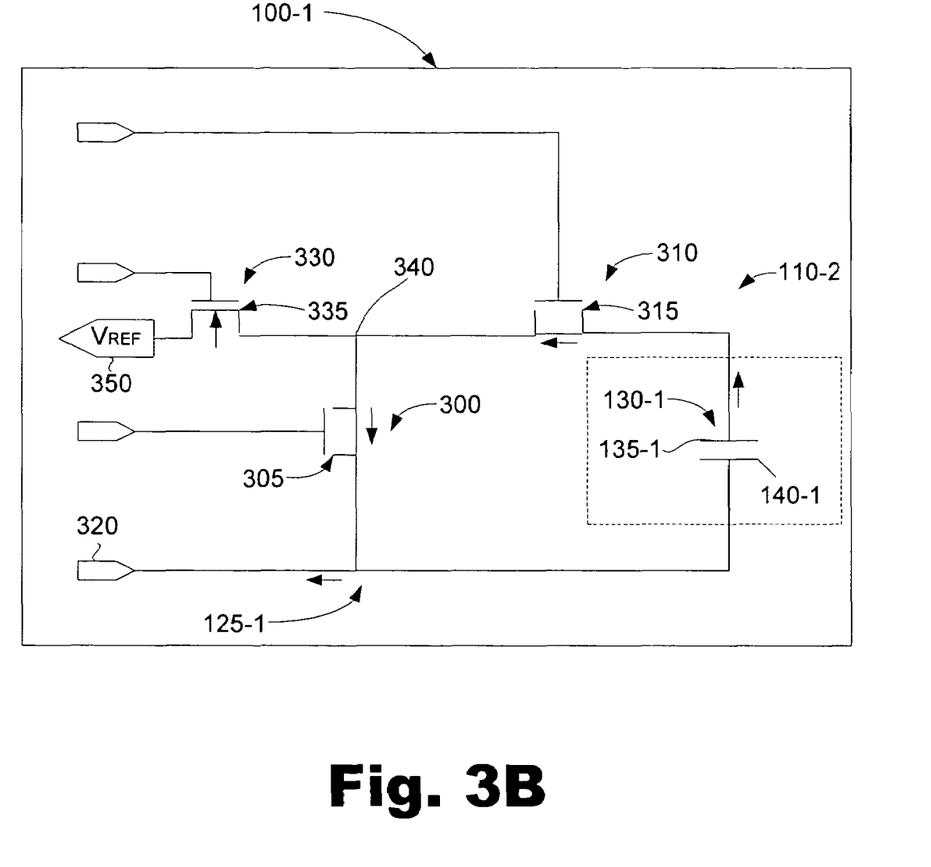
FIG. 3B is a schematic diagram illustrating an exemplary MEMS during a resetting operation.

FIG. 3B illustrates the MEMS (100-1) as the variable capacitor (130-1) is reset during a resetting operation. Resetting the MEMS capacitor (130-1) is accomplished by raising the gate (305) of the clear transistor (300) and the gate (315) of the enable transistor (310) simultaneously to a higher voltage level. Raising the clear transistor (300) and the enable transistor (310) to a high voltage level causes the transistors to act as conductors thereby creating an electrical path from the first or top conductive plate (135-1) to clear voltage (320). Accordingly, raising the clear transistor (300) and the enable transistor (310) to a high voltage level forms a circuit for clearing all the charge from the MEMS capacitor (130-1). The arrows in FIG. 3B show the path the current takes as the charge is cleared from the variable capacitor (130-1) to result in a clear voltage (320). After the variable capacitor (130-1) has been reset, the clear transistor (300) and the enable transistor (320) are returned to the lower voltage level. Returning the clear transistor (300) and the enable transistors (310) to the lower level opens the gates (305, 315), such that the transistors (300, 310) block the flow of charge across them.

Figure 3C:
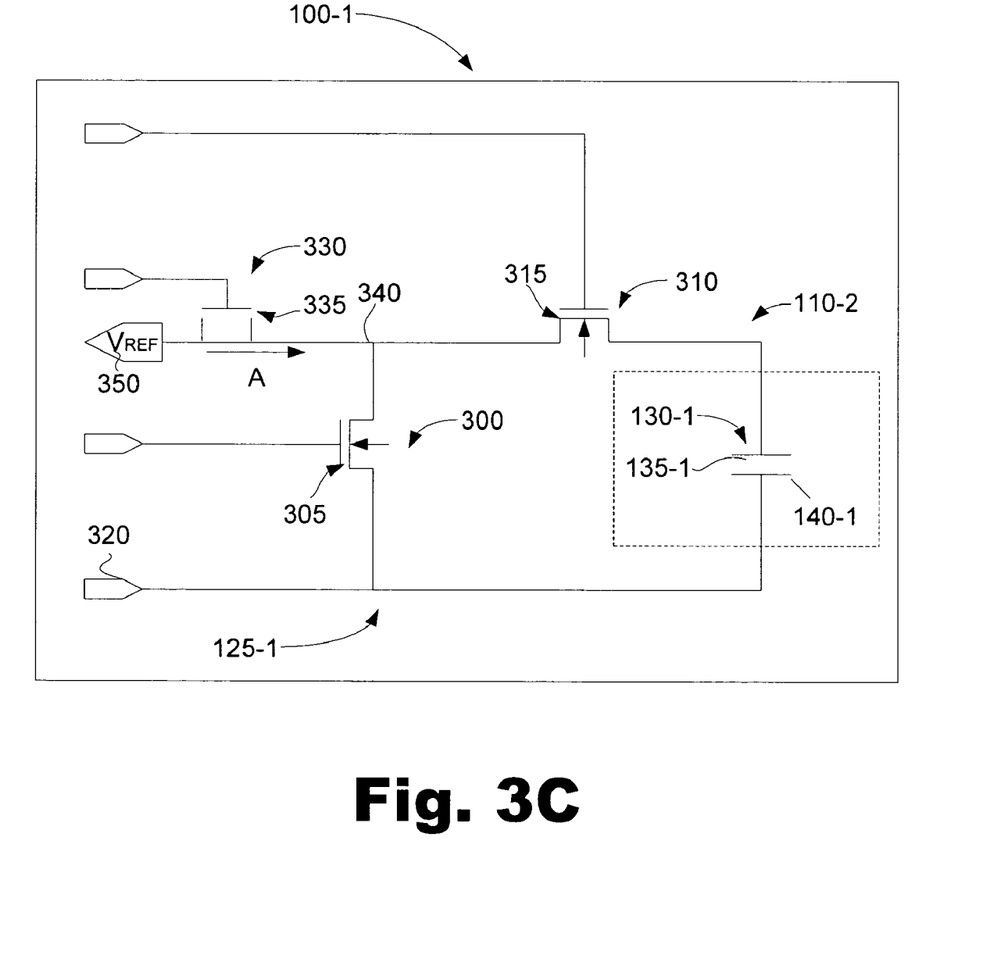
FIG. 3C is a schematic diagram illustrating an exemplary MEMS during a pre-charging operation.

FIG. 3C is a schematic representation of the MEMS as the input node (340) is pre-charged. The input node (340) is pre-charged after the variable capacitor (130-1) has been reset. The input node (340) is pre-charged at a selected reference voltage. The input node (340), the clear transistor (300) and the enable transistor (310) are at a lower voltage level, when the charge enable transistor (330) is raised to the higher voltage level. Raising the charge enable transistor (330) to the higher voltage level closes the gate (335) with respect to $V_{REF}$ (350). Accordingly, raising the charge enable transistor (330) pre-charges the input node (340). The input node (340) is charged because, as previously mentioned, the gate (305) of the clear transistor and the gate (315) of the enable transistor are opened. As a result, the drain of the clear transistor (300) and the source of the enable transistor (310) are isolated from the capacitor node. Opening these gates (305, 315) and the gate (335) of the charge enable transistor (330) to $V_{REF}$ causes the charge to accumulate on the input node (340). The accumulated charge is represented by the large arrow (A). As discussed, the accumulated charge (A) is accumulated because the gate (305) of the clear transistor and the gate (315) of the enable transistor are open. This configuration effectively reduces the capacitance seen on the input node (340) because the variable capacitor (130-1) only 'sees' the capacitance due to the drain on the enable transistor (310). This capacitance may be one half or even less than the capacitance of previous designs. Reducing the capacitance of the input node (340) increases the range of control across the variable gap distance.

Figure 3D:
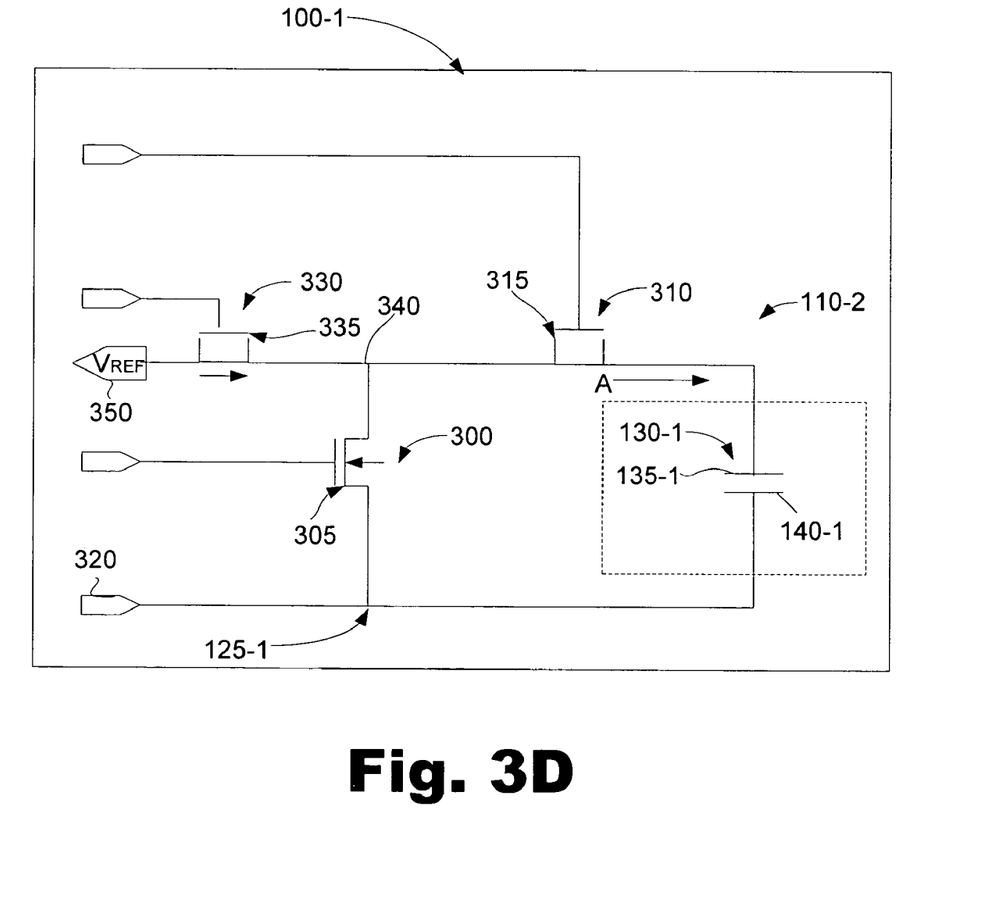
FIG. 3D is a schematic diagram illustrating an exemplary MEMS during a charge pulsing operation.

FIG. 3D is a schematic representation of the MEMS (100-1) as a charge is pulsed to the variable capacitor (130-1). After the input node (340) has been charged, the enable transistor (310) is raised to the higher voltage level. As discussed, raising the enable transistor (310) to the higher voltage causes the enable transistor (310) to act as a conductor. The input node (340) is prevented from dropping to clear the voltage (320) because the gate (305) of the clear transistor (300) is opened. Accordingly, the charge that has accumulated on the input node (340) is able to flow, or is pulsed to the variable capacitor (130-1). The pulse of charge flows across the enable transistor (310) to the first plate (135-1). The time that the enable transistor (310) is held at the higher voltage is known as the pulse duration.

The pulse duration is a period of time that is less than the mechanical time constant of the MEM device (110-2). Further, the pulse duration may be at least as long as the electrical time constant of the MEM device (110-2). As previously discussed, the mechanical time constant causes delays in the movement of the first and second plates (135-1, 140-1) resulting from changes in charge Q on the variable capacitor (130-1). Accordingly, by applying a selectable control voltage from $V_{REF}$ (350) to the MEM device (110-2) based on the duration of the enable signal, the variable capacitance of the MEM device (110-2) appears to be "fixed" for the duration that the reference voltage is applied. Further, as previously discussed, the capacitance of the MEM device (110-2) is lower because the MEM device (110-2) is coupled to a single transistor or switch.

After the enable transistor (310) has been brought again to the lower voltage, the variable capacitor (130-1) stabilizes to its final mechanical state. The single MEMS (100-1) shown in FIG. 3 can be replicated in a large array, with the input voltage, $V_{REF}$ as a column signal and the charge control signal voltages communicated to the clear transistor (300), the enable transistor (310), and the charge enable transistor (330) as row signals.

Figure 4:
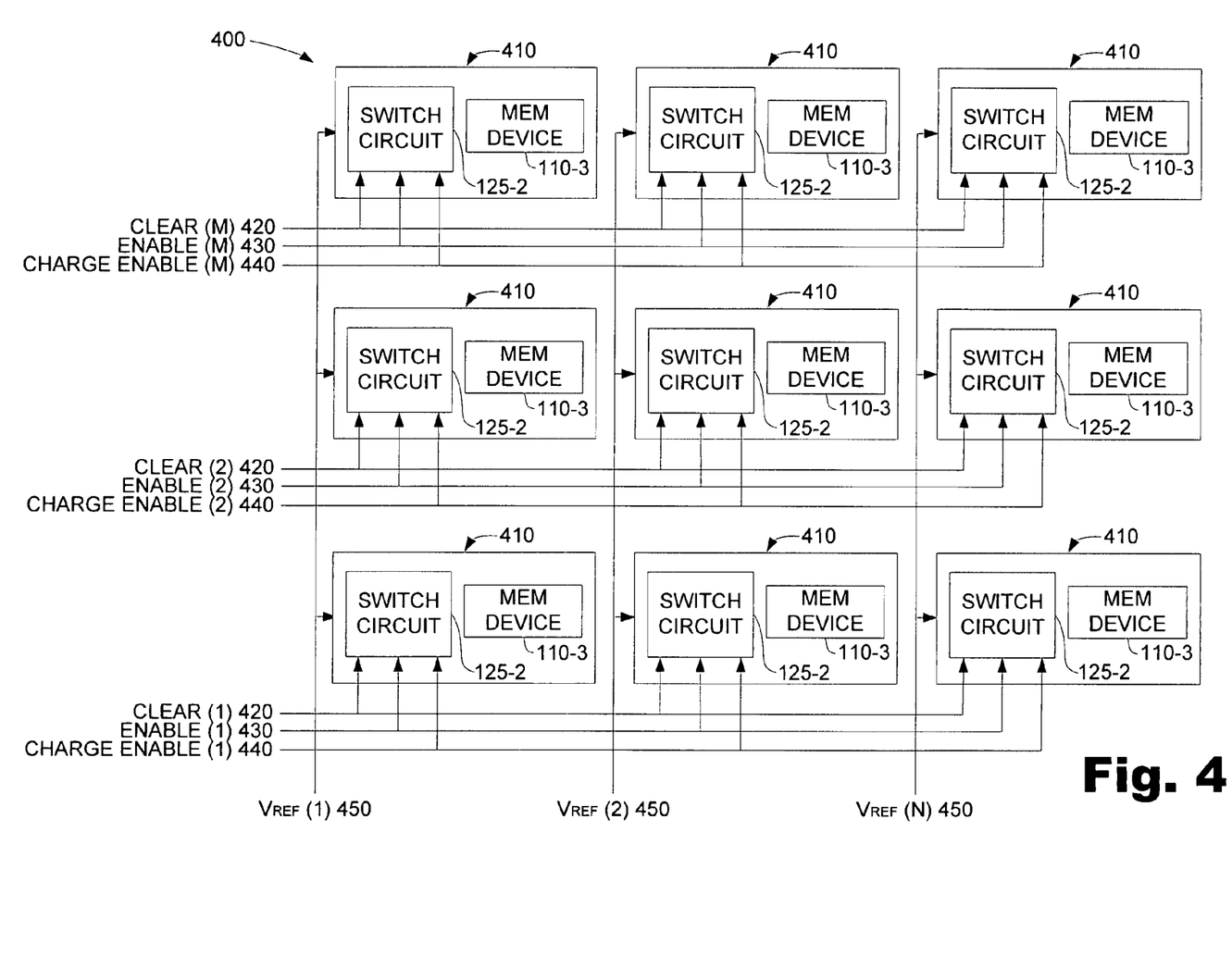
FIG. 4 is a block diagram illustrating an exemplary MEMS having a plurality of MEM cells in an M by N array.

FIG. 4 is a block diagram illustrating an exemplary micro-electromechanical system (MEMS, 400). The MEMS (400) comprises an M-row by N-column array of MEM cells (410). Each of the MEM cells (410) includes a MEM device (110-3) and switch circuit (125-2). Although not illustrated for simplicity, each MEM device (110-3) further includes first and second conductive plates which form a variable capacitor separated by a variable gap distance as shown in FIGS. 3A–3D.

Each switch circuit (125-2) is configured to control the magnitude of a stored charge on the variable capacitor of its associated MEM device (110-3) to thereby control the associated variable gap distance. Each row of the M rows of the array receives separate clear (420), enable (430), and charge (440) signals. Each row of the M rows of the array receives a separate clear signal (420), a separate enable signal (430), and a separate charge signal (440). All of the switch circuits (125-2) of a given row receive substantially the same clear and enable signals. Each column of the N columns of the array receives a separate reference voltage ($V_{REF}$, 450) for a total of N reference voltage signals. The clear voltage (320) is coupled to the system universally, and is therefore omitted.

To store or "write" a desired charge to each MEM device (110-3) of a given row of MEM cells (410), a reference voltage having a selected value is provided to each of the N columns, with each of the N reference voltage signals potentially having a differently selected value. The clear signal for the given row is then "pulsed" to cause each of the switch circuits (125-2) of the given row to remove, or clear, any potential stored charge from its associated MEM device (110-3) as previously discussed. The charge signal (440) for the given row is then given to pre-charge the input nodes of each of the associated MEM device (110-3). The enable signal (430) for the given row is then "pulsed" to cause each switch circuit (125-2) of the given row to apply its associated reference voltage to its associated MEM device (110-3) for the predetermined duration. As a result, a stored charge having a desired magnitude based on the value of the applied reference voltage is stored on the associated variable capacitor to thereby set the variable gap distance based on the desired magnitude of the stored charge. This procedure is repeated for each row of the arrow to "write" a desired charge to each MEM cell (410) of the array.

In the implementations discussed with reference to FIGS. 1–4, the switch circuit (125, 125-1, 125-2) is configured to control voltage. In other implementations, the switch circuit (125, 125-1, 125-2) may be configured to control current. In such implementations the switch, may be a transistor that acts as a current source. For example, in the triode region the enable transistor could act as a resistor to control the current. Further, in saturation mode the enable transistor could directly act as a current source. As a result, a current pulse would accumulate on the input node (340). This pulse current would then be pulsed onto the variable capacitor to charge it.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A charge control circuit, comprising:
 a switch circuit having an input node configured to receive a reference voltage at a selected voltage level and configured to respond to a charge signal to precharge said input node with a pulse charge at said selected voltage level; and
 wherein said switch circuit further includes a single switch configured to respond to an enable signal having a duration shorter than a mechanical time constant of a micro-electro mechanical device (MEM device) having a variable capacitor with first and second plates and wherein said single switch is coupled to said MEM device to apply said selected voltage level across first and second plates of a variable capacitor of said MEM device for said duration to thereby cause said pulse charge to accumulate on said variable capacitor.

2. The charge control circuit of claim 1, wherein said single switch comprises a transistor.

3. The charge control circuit of claim 1, wherein said single switch is a first switch, and said switch circuit further comprises a second switch coupled to said input node and said first switch such that said first switch is between said MEM device and said second switch and wherein said second switch is configured to close to provide said reference voltage to said input node in response to said charge enable signal to charge said input node with said pulse charge.

4. The charge control circuit of claim 3, wherein said switch circuit further comprises a third switch such that said first, second and third switches are on separate branches connecting to said input node.

5. The charge control circuit of claim 4, wherein said first switch is configured to close in response to an enable signal and said third switch is configured to close in response to a clear signal.

6. The charge control circuit of claim 5, wherein closing said first switch in response to said enable signal after charging said input node applies said selected voltage level across said first and second plates.

7. The charge control circuit of claim 4, wherein opening said second switch and closing said first and third switches provides a path between said first plate and a clear voltage for clearing charge from said first plate.

8. The charge control circuit of claim 4, wherein said first, second, and third switches comprise p-channel metal oxide semiconductor devices.

9. The charge control circuit of claim 4, wherein said first, second and third switches comprise n-channel metal oxide semiconductor devices.

10. The charge control circuit of claim 1, further comprising a variable power supply coupled to said input node and configured to provide said reference voltage at said selected voltage level.

11. The change control circuit of claim 10, further comprising a controller configured to provide said charge signal, said enable signal, and a clear signal to control said selected voltage level provided by said variable power supply.

12. A micro-electromechanical cell, comprising:
 a micro-electromechanical (MEM) device having a variable capacitor formed by a first conductive plate and a second conductive plate separated by a variable gap distance; and
 a switch circuit having an input node configured to receive a reference voltage at a selected voltage level and configured to respond to a charge signal to precharge said input node with a pulse charge at said selected voltage level; and
 wherein said switch circuit further includes only a first switch coupled to said variable capacitor configured to respond to an enable signal having a duration shorter than a mechanical time constant of a MEM device and coupled to said MEM device to apply said selected voltage level across first and second plates for said duration to thereby cause said pulse charge to accumulate on said variable capacitor.

13. The charge control circuit of claim 12, wherein said switch circuit comprises a second switch coupled to said first switch and configured to close to provide said reference voltage to said input node in response to said charge signal to charge said input node with said pulse charge.

14. The charge control circuit of claim 13, further comprising a third switch coupled to said input node such that said first, second and third switches are on separate branches connecting to said input node.

15. The charge control circuit of claim 14, wherein said first switch is configured to close in response to said enable signal and said third switch is configured to close in response to a clear signal.

16. The charge control circuit of claim 14, wherein said first, second, and third switches comprise p-channel metal oxide semiconductor devices.

17. The charge control circuit of claim 14, wherein said first, second and third switches comprise n-channel metal oxide semiconductor devices.

18. A micro-electromechanical system, comprising:
 an M-row by N-column array of a micro-electromechanical cells, wherein each cell includes a MEM device having a variable capacitor formed by a first conductive plate and a second conductive plate separated by a variable gap distance; and
 a switch circuit having an input node configured to receive a reference voltage at a selected voltage level and configured to respond to a charge signal to precharge said input node with a pulse charge at said selected voltage level and wherein said switch circuit further comprises a single switch coupled to said variable capacitor and configured to respond to a enable signal having a duration shorter than a mechanical time constant of a MEM device and coupled to said MEM device to apply said selected voltage level across first and second plates of a variable capacitor of said MEM device for said duration to thereby cause said pulse charge to accumulate on said variable capacitor.

19. The system of claim 18, wherein each of said M rows receives a separate enable signal and all of N switch circuits of a given row receive a same enable signal.

20. The system of claim 18, wherein each of said N columns receives a separate reference voltage and all M switch circuits of a given column receive a same reference voltage, wherein each separate reference voltage can have a different selected voltage level.

21. The system of claim 18, wherein each switch circuit is further configured to discharge a stored charge on the variable capacitor in response to said enable signal and a clear signal.

22. A charge control circuit, comprising:
 means for accumulating a charge;
 means for transferring said charge to a variable capacitor;
 means for reducing the capacitance of said means for transferring said charge; and means for removing said charge from said variable capacitor.

23. A method of controlling a micro-electromechanical device having a variable capacitor, comprising:
applying a voltage at a preselected voltage level to charge an input node;
providing an enable signal to a first switch to close said first switch for a duration less than the mechanical time constant of said micro-electromechanical device; and
applying said charge to said variable capacitor wherein said charge corresponds to a gap distance between first and second conductive plates of said variable capacitor and wherein said first switch is the only switch directly coupled to said variable capacitor.

24. The method of claim 23, wherein applying said voltage comprises providing a charge enable signal to said first switch to close said first switch to an input voltage.

25. The method of claim 24, further comprising providing an enable signal and a clear signal to close said first switch and a third switch respectively in order to clear a charge from said variable capacitor.

26. A charge control circuit, comprising:
a switch circuit having an input node configured to receive a reference current at a selected current level and configured to respond to a charge signal to pre-charge said input node with a pulse current at said selected current level; and
wherein said switch circuit further comprises a first switch configured to respond to an enable signal having a duration shorter than a mechanical time constant of a micro-electromechanical device (MEM device) and coupled to said MEM device to apply said selected current level across first and second plates of a variable capacitor of said MEM device for said duration to thereby cause said pulse current to accumulate on said variable capacitor wherein the first switch is the only connected to said capacitor.

27. The charge control circuit of claim 26, wherein said variable gap distance is a function of the magnitude of said stored charge.

28. The charge control circuit of claim 26, wherein said switch circuit further comprises a second switch coupled to said MEM device and configured to close to provide said reference current to said input node in response to said charge signal to charge said input node with said pulse current.

29. The charge control circuit of claim 28, further comprising a third switch coupled to said input node and a clear voltage.

30. The charge control circuit of claim 29, wherein said first switch is configured to close in response to said enable signal and said third switch is configured to close in response to a clear signal.

31. The charge control circuit of claim 30, wherein closing said second switch in response to said enable signal after charging said input node applies said selected current level across said first and second plates.

32. The charge control circuit of claim 29, wherein opening said first switch and closing said second and third switches provides a path between said first plate and said clear voltage for clearing charge from said first plate.

33. The charge control circuit of claim 29, wherein said first, second, and third switches comprise p-channel metal oxide semiconductor devices.

34. The charge control circuit of claim 29, wherein said first, second and third switches comprise n-channel metal oxide semiconductor devices.

* * * * *